(12) United States Patent
Hiisilä

(10) Patent No.: US 11,072,431 B2
(45) Date of Patent: Jul. 27, 2021

(54) LAUNCHING DEVICE FOR LAUNCHING AN OBJECT

(71) Applicant: SkyCat Oy, Forssa (FI)

(72) Inventor: Henri Hiisilä, Forssa (FI)

(73) Assignee: SkyCat Oy, Forssa (FI)

(*) Notice: Subject to any disclaimer, the term of this patent is extended or adjusted under 35 U.S.C. 154(b) by 312 days.

(21) Appl. No.: 16/080,351

(22) PCT Filed: Mar. 13, 2017

(86) PCT No.: PCT/FI2017/050161
§ 371 (c)(1),
(2) Date: Aug. 28, 2018

(87) PCT Pub. No.: WO2017/158234
PCT Pub. Date: Sep. 21, 2017

(65) Prior Publication Data
US 2019/0047725 A1    Feb. 14, 2019

(30) Foreign Application Priority Data

Mar. 14, 2016    (FI) .................................... 20160062

(51) Int. Cl.
*B64D 17/70*    (2006.01)
*B64D 17/80*    (2006.01)

(52) U.S. Cl.
CPC ............. *B64D 17/70* (2013.01); *B64D 17/80* (2013.01); *B64C 2201/185* (2013.01)

(58) Field of Classification Search
CPC ........ B64D 17/62; B64D 17/70; B64D 17/80; B60T 1/16; B64F 1/04; A63H 33/20
See application file for complete search history.

(56) References Cited

U.S. PATENT DOCUMENTS 3,568,201 A * 3/1971 Spoonamore ............ H01Q 1/28
343/705
3,749,017 A * 7/1973 Peterson ................. F42B 10/56
102/387

(Continued)

OTHER PUBLICATIONS

Search report of Finnish Patent Application No. FI20160062 issued by Finnish Registration and Patent Office dated Oct. 12, 2016.

(Continued)

*Primary Examiner* — Joseph W Sanderson
(74) *Attorney, Agent, or Firm* — Meunier Carlin & Curfman LLC

(57) ABSTRACT

A device for launching an object is described. The device comprises a frame affixed to the launch pad, a push element for pushing an object detached from the launch pad, and a flexible force storing element for turning the push element in relation to the frame. The device has a casing fixed to the frame at a fixing point for holding the object in place against the push element. The device has a lock element for locking the casing in standby position. The frame and the push element are superposed and connected to each other at one edge of the device. The frame and the push element are substantially parallel. Force stored in the force storing element is releasable for displacing the push element at a moment of launch. The force storing element may be at least one spring or elastic band or an extension spring.

9 Claims, 2 Drawing Sheets

(56) References Cited

U.S. PATENT DOCUMENTS

| | | | | |
|---|---|---|---|---|
| 3,833,192 | A * | 9/1974 | Vitack | B64D 17/80 244/139 |
| 4,008,541 | A * | 2/1977 | Russer | A63H 33/20 446/51 |
| 4,050,657 | A * | 9/1977 | Murphy | B64D 17/80 244/139 |
| 4,113,208 | A | 9/1978 | Manfredi | |
| 4,298,177 | A * | 11/1981 | Berlongieri | B64D 17/80 244/100 R |
| 5,549,497 | A | 8/1996 | Johnson | |
| 5,673,875 | A * | 10/1997 | Martin | B64D 17/80 244/139 |
| 8,403,268 | B2 * | 3/2013 | Suze | B64D 17/64 244/149 |
| 9,611,044 | B2 * | 4/2017 | Hiisila | B64D 17/64 |
| 10,737,794 | B2 * | 8/2020 | Lee | B64D 17/72 |
| 2016/0318615 | A1 * | 11/2016 | Pick | B64C 39/024 |
| 2017/0225792 | A1 * | 8/2017 | Wang | B64C 39/024 |
| 2018/0244394 | A1 * | 8/2018 | Lee | B64C 39/024 |

OTHER PUBLICATIONS

Written Opinion of the searching authority of the international application No. PCT/FI2017/050161 issued by Finnish Registration and Patent Office dated Jun. 16, 2017.

* cited by examiner

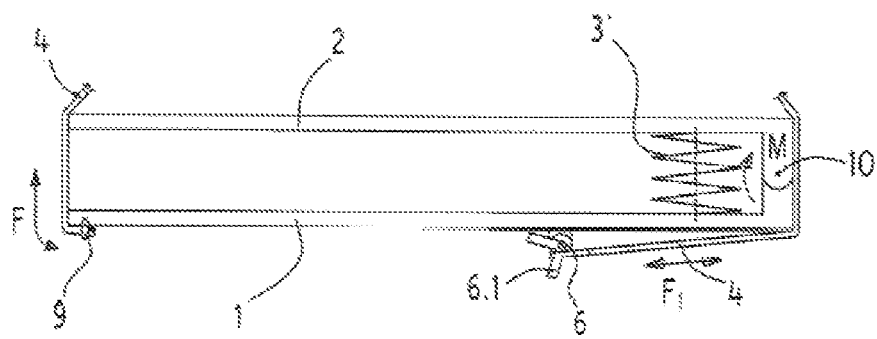
Fig. 2
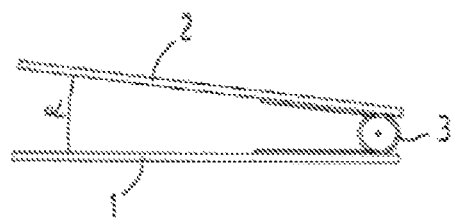 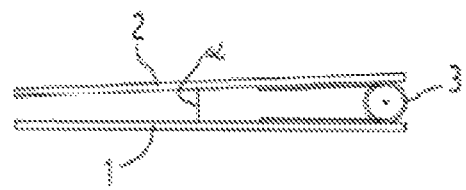
Fig. 3a        Fig. 3b
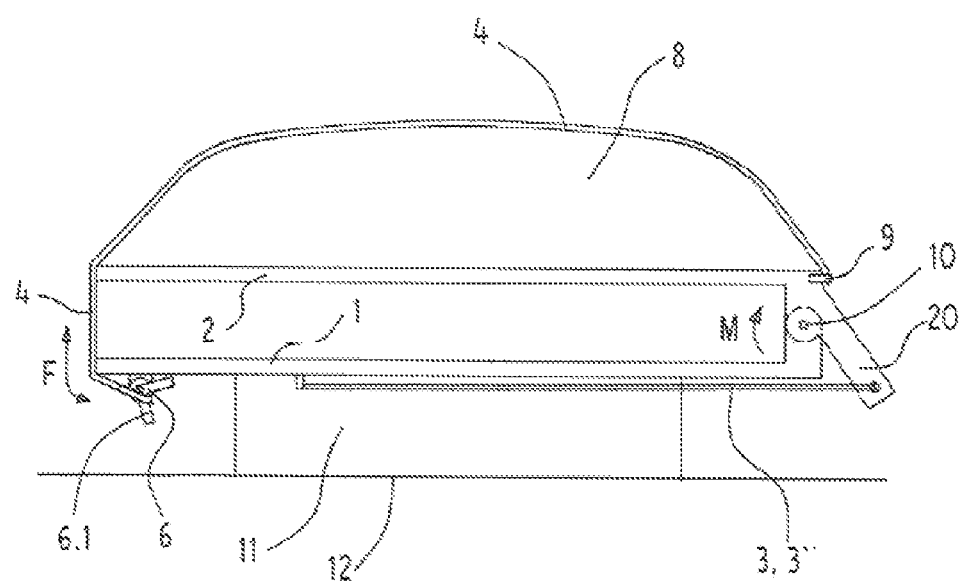
Fig. 4        PRIOR ART

LAUNCHING DEVICE FOR LAUNCHING AN OBJECT

PRIORITY

This application is U.S. National Phase application of PCT application number PCT/FI2017/050161 filed on Mar. 13, 2017 and claiming priority of Finnish national application number FI20160062 filed on Mar. 14, 2016, the contents of both of which are incorporated herein by reference.

FIELD AND BACKGROUND

An object of the invention is a launching device for launching an object from a launch pad, wherein said apparatus comprises a frame affixed to the launch pad, a push element for pushing an object detached from the launch pad, a flexible force storing element for turning the push element in relation to the frame, a casing for holding the launchable object in place against the push element, and a lock element for locking the casing in standby position and for bringing the launching device in a position of ready to operate such that the frame and the push element are superposed and connected to each other substantially at one edge of the device, the frame and the push element being substantially parallel or at certain advantageous angle relative to each other, force being stored in the force storing element for displacing the push element and that said stored force being releasable at a moment of launch.

Advantageous applications of the invention are, for example, flying apparatuses typically equipped with a parachute, such as multicopters, drones, miniature aircrafts, aircrafts, space shuttles, probes, and so on, as well as certain devices moving on a ground and being equipped with brake parachutes, such as drag race cars and speed record vehicles.

The invention is used in situations, where a launchable object is to well maintain its position until the moment of launch, in which situation the launching action shall be effected securely and without disturbances. Launching devices are occasionally maintained remarkably long periods in a standby position and in most cases the standby position lasts the whole service life of the device. Because this lock state of the launchable object needs to be maintained continuously it is very important that lock elements function troubleproof for long periods of time. A challenge to such is posed by enablement of securing such strict enough locking and at the same time assuring release of the locking when necessary. The challenge is increased by need of adequately forceful launch, wherein the locking must be at a corresponding level with the launching force.

Launching devices according to prior art are composed such that a launching device is fixed at a frame of the launching device to a launch pad and a push element for executing the launch is connected and swiveled to said frame. After this a launchable object is put against to the push element and the launchable object is enveloped by a casing, which is locked to the frame fixed lock element. When locking of the casing is released, appropriate excited elastic bands pull the push element to a movement turning around a swivel of the push element, and the launchable object set against the push element is ejected away from it. The lock element is controlled to release the locking at the moment of launch. A servo is a known used lock element, which has a lever fixed to its axle, wherein the lever maintains the locking at a certain position and releases the locking when turned.

Previously described technology is used in production of Opale Paramodels, inter alia.

The biggest disadvantage of the known launching device may be considered to be an issue that a force for maintaining a casing around a launchable object effecting to a lever via the casing is substantially equal with a force stressing the casing for preventing turning of push element. The force is mediated via the casing to the lock element substantially equal with the force provided to the casing by a force storing element, since friction forces eliminate it only at a corner of an end edge of a frame being close to a locking end of the casing.

Due to the previously mentioned disadvantage power of an apparatus for maintaining locking of casing, such as a servo, needs to be fitted in accordance to the force. In order to maintain the power such that locking is prevented from being released at incorrect moment of time, an accumulator or a battery fitted with size and charging capacity in accordance to such power is needed, or alternatively a shorter standby time has to be satisfied with. In a case of a flying device optimizing weight is always a primary aim. Weight which cannot be avoided is to be compensated by increasing power.

SUMMARY

Aim of this invention is to accomplish a launching device for launching an object, which enables avoiding disadvantages of prior art. The implementation according to the invention is characterized in what presented in the claims.

In view of prior art most advantageous for the invention may be that a force for maintaining a casing around a launchable object effecting to a lever via the casing is substantially smaller than a force stressing the casing at the location, where it prevents a push element from turning due to a spring force. When force is supplied from a part of the casing, which connects said frame and the push element, to the lock element and lever of it, friction forces eliminate most of the force on the way. While the casing is flattened against the launchable object and the frame, as well as corners of the frame, due to inventive structure such high friction forces effecting on the casing are generated that the force effecting to the lock device via the casing is substantially smaller compared to a force for keeping the frame and the push element together.

The previously presented is followed by an immediate advantage of enabling realizing a lock element, such as e.g. a servo equipped with decreased power and charging capacity of energy supplying accumulator/battery, as well as physical weight.

In this application a term side refers to a side of a substantially angulated part and in addition to a certain part of an arc of a circular or a curved part or a straight part concurring with a curved part.

DESCRIPTION OF THE DRAWINGS

The invention is described more closely with the accompanied drawings, in which

FIG. 2 illustrates an another embodiment of the invention

FIGS. 3a and 3b illustrate some other embodiments of the invention

FIG. 4 illustrates essential parts and an operational principle of a known launching device.

DETAILED DESCRIPTION

Figure 1A:
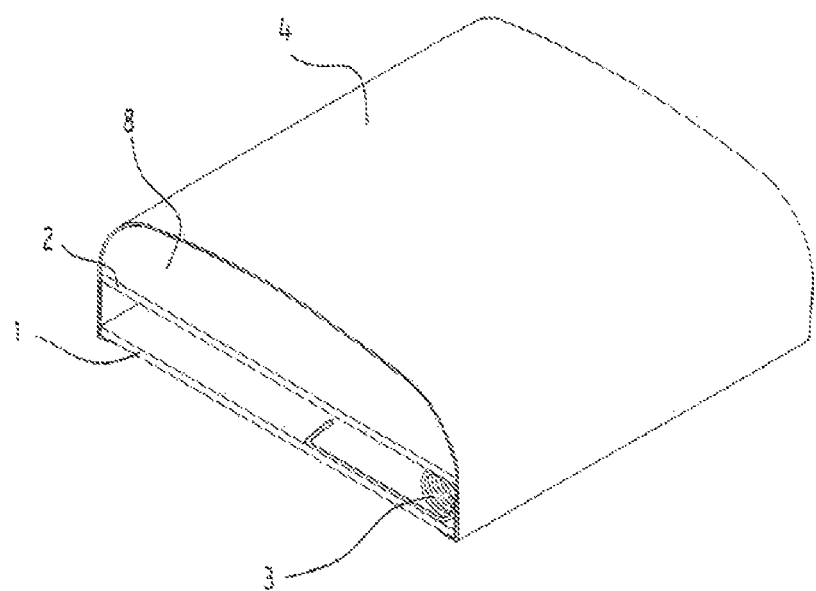
FIGS. 1a and 1b illustrate an embodiment of the invention.

In the following a structure and an operation of an advantageous implementation of the invention is described with reference to the accompanying figures.

FIG. 4 illustrates an arrangement, which is a base for known technology. A frame 1 of a launching device and a push element 2 have been superposed onto each other and those have been fixed to each other at one side of the arrangement such that at a certain moment of launch, push element is capable of turning in relation to the frame around a swivel 10, which is functioning as a pivot point. A (launchable) object 8 is arranged against the push element 2 and the object 8 has been enveloped by a casing 4, which is fixed at one end to the push element, at a fixing point 9 next to the swivel and at the other end to a lock element 6 fixed to the frame 1, at the other edge of the arrangement. The casing 4, being locked to the lock element 6, keeps the push element 2 in place and prevents excited elastic bands 3" (two elastic bands are presented in this example), which extend from protrusion 20 at the swivel side end of the push element to the frame, from pulling the push element to a swiveled movement around the swivel 10. When locking of the casing is released, the elastic bands 3" turn the push element, which in turn pushes the object 8 away from the launching device.

Figure 1B:
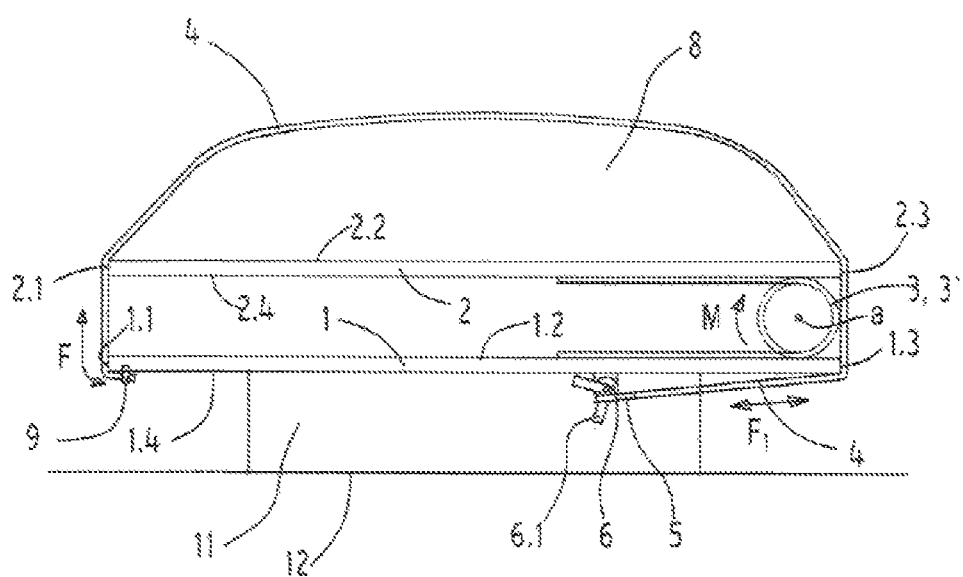

FIGS. 1a and 1b illustrate an inventive implementation of a launching device, in which a frame 1 and a push element 2 have been connected to each other via a spring 3' adjusted between the two. The spring is located at an edge of the arrangement, close to the third sides of the frame 1.3 and of the push element 2.3, and the spring is in excited state when the frame and the push element are superposed on top of each other as in the figures. The casing 4 has been connected (fixedly) to the fourth side 1.4 of the frame 1 and adapted to extend over the first side of the frame 1.1 and the first side of the push element 2.1, over a launchable object 8, and further over the third side of the push element 2.3 and the third side of the frame 1.3, and over bottom edge of the frame, to the lock element 6 located at the fourth side of the frame, via a fastener 5. The spring 3' causes force F to the fixing point 9 and to the casing nearby.

While the casing 4 extends from the fixing point 9 over the object 8 and further, compression of the casing 4 against the object 8, the third side of the push element 2.3 and the third side of the frame 1.3, as well as against the bottom corner of the frame, causes friction forces, which eliminate the most part of the force F. Due to this, a force $F_1$, which stresses the lock element 6 and a lever 6.1 of the lock element 6, is essentially smaller compared to the force F. Implementation of binding the object 8 at its place according to a principle described above, lock element 6 and electronic devices operating such may be fitted according to the force $F_1$, being considerably smaller than in prior art.

When locking of the lock element 6 is released, a spring force of the spring 3', illustrated in the Figure Tb, being a torque spring of a coil spring type, causes a torsional moment M, which turns the push element 2 around a center axle a of the spring.

The spring 3' may also be a compression spring or a combination of multiple springs, which function according to a principle of a coil spring, a bow spring or a leaf spring.

In implementations including a swivel 10 axle of influence of a moment M is formed at a center axle of a swivel 10 combining the frame 1 and the push element 2. An implementation of this kind is presented in FIG. 2.

As shown in FIGS. 1b and 2, the lock element 6 is arranged at the same edge of the launching device with the spring 3' and/or the swivel 10. This deviates from the known technology illustrated in FIG. 4, in which the swivel 10 and the lock element 6 are arranged at the opposite edges of the launching device. Arranging the lock element 6 and the spring 3' at the same edge of the launching device brings about the effect that the $F_1$ stressing the lock element 6 and the lever 6.1 of the lock element 6, is smaller compared to the force F stressing the lock element 6 in the launching device according to the known technology. When the releasable locking is arranged on the edge of the swivel and/or the spring, the force needed for releasing the locking is smaller compared to the situation where the releasable locking and the swivel and/or the spring are arranged on the opposite edges of the launching device.

The casing 4 is adapted to extend from the fixing point 9 of the casing 4 at least over a first side of the push element 2.1, over the launchable object 8 placed on the second side 2.2 of the push element 2, and further to the lock element 6 placed on the second side 2.2 of the push element 2 or beyond that, either directly or via a fastener 5. One end of the casing 4 has been fixedly attached to the frame 1 at a fixing point 9 and another end of the casing 4 has been fixed to the lock element 6 next to the spring 3' and/or the swivel 10 on the other side of the launching device. The lock element 6 is fitted to lock the casing 4 around the launchable object 8 until the moment of launch of the object. Friction between the casing 4 and the elements in contact with it, at least the push element 2 and the launchable object 8, has been adapted to eliminate an essential part of a force F effected by the spring 3', the elastic band (3") or the extension spring.

The invention may be applied by using one or more elastic bands 3" or extension springs for providing launching force. In such case elastic bands and/or extension springs function according to the principle of FIG. 4, where a placement of the casing 4 is fitted in the inventive way, as presented above.

The launching force is provided by a force storing element 3, which is composed of one or more (torsion-, compression- or leaf-) springs 3', elastic bands 3" or an extension springs functioning as such.

The frame 1 and the push element 2 are considered according to this inventive implementation essentially parallel, also when an angle α between the two differs from zero at a range, wherein the launching device according to the invention is capable of operating according to the previously presented principle.

The launching device according to the invention is fixed via the frame 1 to an operation pad 12 of the launching device by a fixing device 11, in which case when launch is effected, the frame 1 maintains its position in relation to the pad 12 and the push element 2 turns and ejects the object 8 off from the launching device.

Direction of the pad 12 may be any direction in relation to the environment of use of it. If the casing 4 is fixed to the fixing device 11 or to the pad 12, it is considered to be an integral part of the frame 1.

The pad 12 may be, for example, a multicopter, a drone, a miniature aircraft, an aircraft, a space shuttle, a probe, a gliding chute, a hot-air balloon, and so on, or a certain device movable onwards on a ground, equipped with a brake parachute, such as a drag race car or a speed record vehicle, in which case the launchable object 8 is a parachute or an arrangement of parachutes.

A push element 2 is a plate like part, on top of which a launchable object 8 may be arranged.

A casing 4 may be formed of fabric, plastic- or rubber plate, or of any other elastic or inelastic material. It is essential that it enables imposing the object 8 in a supporting manner against the push element 2.

A lock element 6 may be e.g. a servo and a lever 6.1 may function as a locking of a casing 4 or of a fastener 5 fixed to the casing 4, like for example of a link. The lock element 6 may also be some other apparatus according to prior art suitable for previously presented locking and maintaining the locking. Releasing the locking may be effected via remote control or via automatic release based on a change of condition recognized by a sensor.

A fixing point 9 of a casing may be located also at the first side of the frame 1.1 or at the second side of the frame 1.2, or at another advantageous place of the frame, and a lock element 6 may be located at the third side 1.3 instead of the fourth side 1.4, or at another advantageous place of the frame or, in some cases, at the second side of the push element 2.2 or at the third side of the push element 2.3.

As presented above, a force storing element 3 may be comprised of more than one force storing parts, such as a spring and/or an elastic band or -yarn. Springs or elastic bands placed on both edges of the device may be presented as an example. Also a swivel 10 may be implemented such that it is comprised, for example, of two parts of the swivel placed at the edges of the device. The casing 4 or the fastener 5 may then be guided to the lock element 6 between the two parts of the swivel.

It is to be noted that while this description is kept to one kind of advantageous implementation example of the invention, this is meant in no way limiting use of the invention to only such kind of example, but many variations are possible in view of the inventive idea as determined by the claims.

The invention claimed is:

1. A launching device for launching a launchable object from a launch pad, the launching device comprising:
   a frame attached to the launch pad;
   a push element for pushing the launchable object off from the launching device;
   an elastic force storing element for turning the push element in relation to the frame, wherein the elastic force storing element comprises at least one spring;
   a casing for keeping the launchable object at place against the push element;
   a lock element for locking the casing at a standby position and for bringing the launching device ready to operate such that the frame and the push element are superposed, attached to each other at one side of the device, and parallel or at a certain angle in relation to each other, and such that a force is being stored in the elastic force storing element for displacing the push element and said stored force is releasable at a launching moment of the launchable object;
   wherein
   the frame and the push element are attached to each other via the at least one spring,
   and wherein the launchable object placed against the push element is enveloped by the casing, which is attached fixedly to the frame at a fixing point at one end of the casing, and another end of the casing is fixed to the lock element located next to the at least one spring such that the lock element is fitted to lock the casing to envelope the launchable object until the moment of launch when friction between the casing and at least the push element and the launchable object being in contact with the casing has been adapted to eliminate a force effected by the at least one spring.

2. The launching device according to claim 1, wherein the casing is adapted to extend from the fixing point of the casing to at least over a first side of the push element, while the launchable object is placed on the second side of the push element, and further to the lock element placed on the second side of the push element or beyond that.

3. The launching device according to claim 1, wherein the at least one spring is a torque spring, and an axle of influence of a moment arranged to accomplish the force is a center axle of the torque spring.

4. The launching device according to claim 1, wherein the launching device comprises at least one additional elastic force storing element.

5. The launching device according to claim 1, wherein the launchable object is a parachute or an arrangement of parachutes.

6. The launching device according to claim 1, wherein the pad is a multicopter, a miniature aircraft, a drone, an aircraft, a space shuttle, a probe, a gliding chute, a hot-air balloon or a device movable onwards on a ground equipped with a brake parachute.

7. The launching device according to claim 1, wherein the casing comprises fabric, plastic or rubber.

8. The launching device according to claim 1, wherein the lock element comprises a servo and a lever.

9. The launching device according to claim 1, wherein the frame and the push element are attached to each other via the at least one spring.

* * * * *